UNITED STATES PATENT OFFICE.

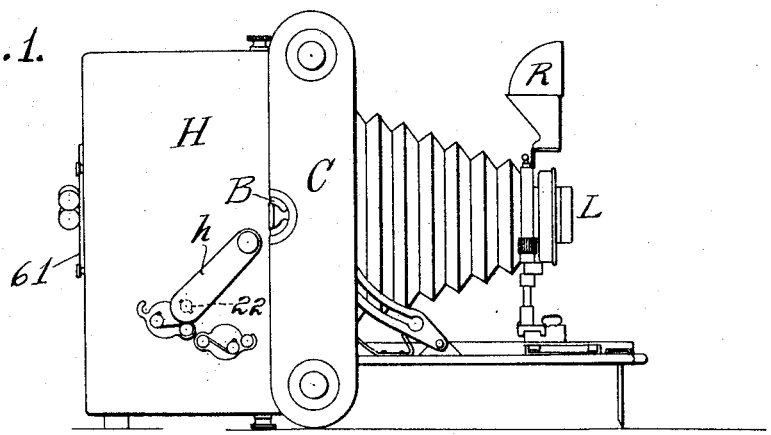
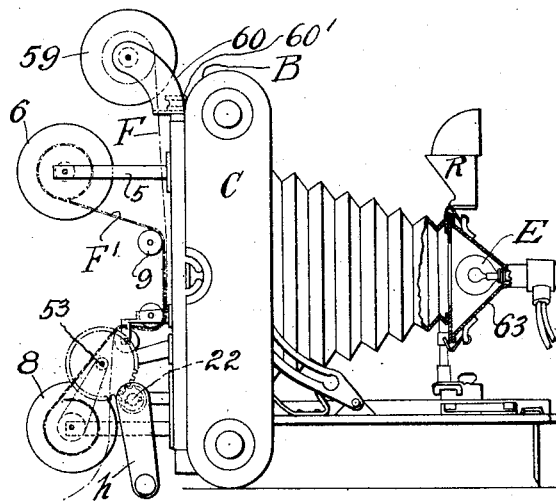
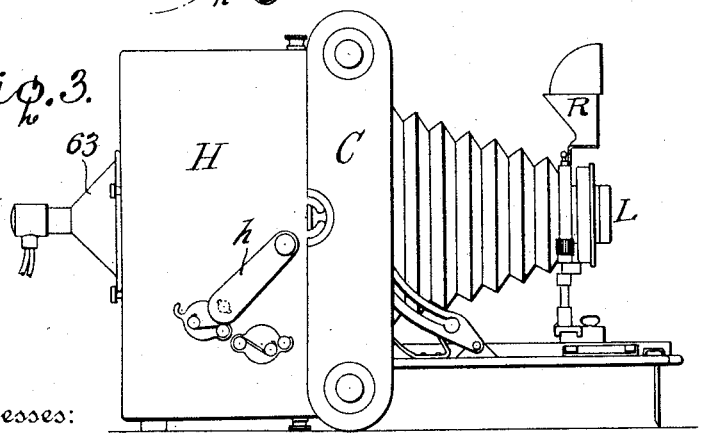

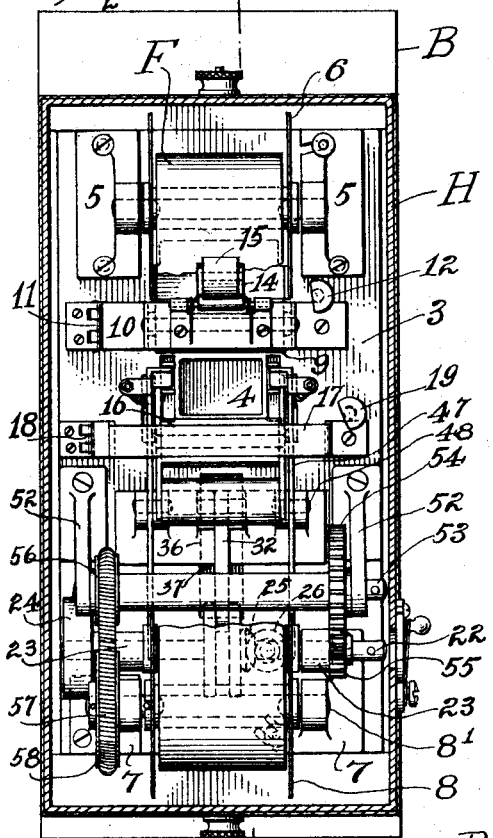

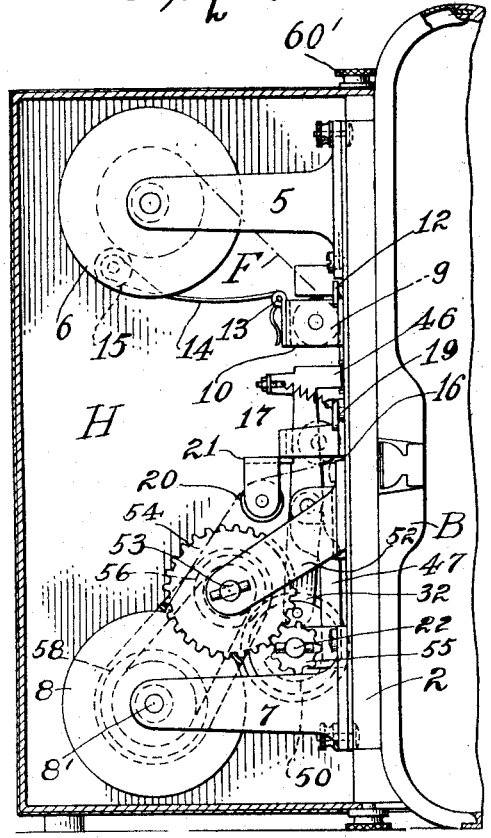

HENRY CSANYI, OF NEW YORK, N. Y.

MOTION-PICTURE APPARATUS.

1,187,270.   Specification of Letters Patent.   Patented June 13, 1916.

Application filed July 29, 1915. Serial No. 42,523.

*To all whom it may concern:*

Be it known that I, HENRY CSANYI, a subject of the King of Hungary, having filed his citizenship papers, residing at New York, in the county of New York and State of New York, have invented new and useful Improvements in Motion-Picture Apparatus, of which the following is a specification.

This invention relates to a motion picture apparatus through the agency of which the pictures may be first taken, then printed or reproduced, and subsequently projected on the usual screen for exhibition purposes.

In the present instance, I have shown the preferred embodiment of my invention as embracing and operating in conjunction with a well known type of film camera with which it is detachably associated, but I wish it to be understood that I do not limit myself to this particular application of the invention, as the latter in its broad aspects contemplates the taking, printing and exhibiting of motion pictures through the medium of a complete, self contained, unitary apparatus as contra-distinguished from a series of separate distinct machines such as are now commonly employed in the preparation and production of these pictures. Furthermore where my invention is used in conjunction with any well known form or type of film camera, it is to be understood that the essential structural features of the latter need not be modified, changed or reorganized in any manner whatsoever.

In carrying out my invention, it is my purpose to provide a motion picture apparatus which will enable an ordinary person to take such pictures as may be desired and to subsequently prepare and exhibit these pictures at the home, or elsewhere, as conditions may warrant, this being accomplished with a minimum expenditure of time and labor.

Another object of the invention is the provision of a relatively small, compact, portable, manually operable motion picture apparatus which will embody the desired features of simplicity, efficiency and convenience, and which may be manufactured, marketed and operated at a comparatively small expense.

It is also my purpose to provide a novel form of film feeding mechanism which is adapted to frictionally engage and feed the film at predetermined times, my feeding mechanism enabling me to employ a film having imperforate edges. In other words, I dispense with the usual rows of perforations located adjacent the edges of the ordinary motion picture film and, of course, I also dispense with the use of the sprocket-wheel mechanism for engaging the perforations of the ordinary film.

With the above recited objects and others of a similar nature in view, the invention consists in the construction, combination and arrangement of parts set forth in and falling within the scope of the appended claims.

In the accompanying drawings, Figure 1 is a view in side elevation of a well known type of film camera having my invention applied thereto, the apparatus being shown in condition for taking a picture. Fig. 2 is a similar view, but showing the apparatus in condition for printing the positive or exhibition film from the negative or master film, in this instance the casing of the apparatus being omitted, and the light shown is substituted for the lens. Fig. 3 is a view in side elevation showing the apparatus in condition for use as a projecting machine for exhibiting the pictures. Fig. 4 is a view in rear elevation, the back of the casing being removed. Fig. 5 is a top plan view with the top of the casing removed. Fig. 6 is a view of the inside face of the back of the camera and showing the shutter and certain mechanism operating in conjunction therewith. Fig. 7 is a view in side elevation of my apparatus, the casing being shown in section. Fig. 8 is a vertical, longitudinal, sectional view taken on the line 8—8 of Fig. 4. Fig. 9 is a detail view of the film feeding mechanism and showing the latter in position just prior to the release of the film. Fig. 10 is a similar view showing the film as engaged and ready to be moved by the film feeding mechanism. Fig. 11 is a perspective view of a portion of the film.

Before entering into a detailed description of my invention, I will briefly state that, in the form shown herein, it embodies, among other features, a film camera having detachably associated therewith a casing or housing in which I locate the traveling film, the film moving mechanism, and the shutter mechanism.

In the production of motion pictures, through the medium of my apparatus, the first step to be followed, of course, is to take the pictures. To do this, the sensitive film is trained over the film spools in the casing as will be readily understood. The detachable housing, when applied to the camera, forms a continuation of the body or casing of the latter and, with the film properly positioned in the housing, the operator may turn a crank, or other operating element, and cause the film to travel past the lens, the shutter at the same time opening and closing at proper intervals so that the film will be exposed to take the pictures in the well known manner. The film thus exposed forms a negative or master film which is now removed from the machine and developed in the usual manner. After the development of this master or negative film, it may be replaced in the camera along with a second film, the two films being trained together to travel past the opening controlled by the shutter of the machine. This second film, which is sensitive or unexposed, is adapted to be printed upon from the first film to form an exhibition or positive film. This printing is accomplished by removing the lens from the camera and applying in the place of the lens a suitable light,—in the present instance, an electric lamp. With the lamp substituted for the lens, and the two films properly trained together over suitable spools, the operator again turns the crank, or other operating element, and causes the two films to travel in synchronism past the opening controlled by the shutter; the shutter, of course, opening and closing at proper intervals so that the pictures on the first or master film will be reproduced upon the second or exhibition film. After the positive or exhibition film has been so printed, it in turn is removed from the camera and developed in a dark room according to the ordinary practice. After the development of this exhibition film, the latter is ready for reproduction, or use in the exhibition or projection of moving pictures. In exhibiting the pictures, the usual screen is, of course, employed, and the light or lamp, which was employed at the lens end of the camera in the printing of the exhibition film, is now transferred to the rear or opposite end of the camera from the lens, and the lens is replaced, so that when the parts are assembled, as shown in Fig. 3 of the drawings, the film is interposed between the lamp and the lens. The machine is now ready for exhibition of the pictures and the operating crank is actuated as usual to project the pictures upon the screen. In the taking, printing and exhibiting of the pictures the same film moving mechanism is used in each instance, this film moving mechanism, in the present case, including devices for frictionally and intermittently engaging the edges of a preferably imperforate film to draw the latter past the opening controlled by the shutter. The shutter is driven from the same source of power which actuates the film moving mechanism so that when the shutter is open, the film stands still, while, when the shutter closes, the film is frictionally engaged by the moving devices and caused to travel as will be readily understood hereafter.

Referring now to the accompanying drawings in detail, and particularly to Figs. 1, 2 and 3 thereof, the letter C indicates a film camera of any ordinary and well known type, having the usual lens L and the finder R. As the camera shown herein is what is commonly known as a folding pocket kodak, it is merely conventionally illustrated. The back of the camera is shown at B, and this back also forms the front wall of the housing H. As will be seen by reference to Figs. 6 and 8, this back is of skeleton form and has a relatively large rectangular opening 1 cut therein. This opening 1 is surrounded by a suitable rectangular frame 2 which projects from the outer wall of the back. Suitably fastened to this frame 2 is a plate 3 having the opening 4 cut therein and past which opening the film travels for exposure as hereinafter described, this opening being controlled by the shutter S. Bolted to the plate 3, adjacent the top edge thereof, is a pair of bracket arms 5 forming bearings for the film unwinding spool 6. Likewise adjacent the bottom of the plate 3, or below the shutter opening, I provide a pair of bracket arms 7 which form a bearing for the shaft 8' of the film winding spool 8 on which the film is adapted to be wound. In order that the construction and operation of my invention may be clearly understood, I have shown in Fig. 2 a master film at F and an exhibition film at F¹. In using the spools 6 and 8, a film, for instance the film F¹, is fastened to and wrapped about the upper spool 6 and is then passed downward beneath the roller 9, carried by the upper clamping bar 10, this latter bar being hinged at one end, as at 11, to the back plate 3, and at its opposite, or free end, it is adapted to be held against movement by the thumb catch 12. To this clamping bar 10 is hinged, as at 13, the spring tensioned arm 14, this arm having at its free end a roller 15 adapted to bear against the film on the spool 6 and maintain the latter at the proper tension and at the same time this arm 14 acts as a guide for the film as it reels off the roller. From the roller 9 of the clamping arm 10, the film is passed downward across the shutter opening 4. The film then passes beneath the clamping feet 46 of the film feeding mechanism, which will be hereinafter described more in detail, and thence beneath the roller 16 of the clamping bar 17, the latter being hinged at one end, as at 18, to the back plate 3 and at its opposite end is detachably fastened by means of the thumb catch 19. The film is then trained over the guide roller 20 carried by the bracket 21 which, in the present instance, is attached to the clamping bar 17. From this guide roller 20 the film passes to the lower or winding spool 8 and is fastened thereto in the usual manner.

In order to feed the film and at the same time operate the shutter S at proper intervals, I employ the following mechanism: The numeral 22 indicates a power shaft which is journaled in a pair of small brackets 23 affixed to the back plate 3, and one end of this shaft may be provided with a detachable crank or handle $h$ for the purpose of turning the shaft and thus actuating the film moving and shutter operating mechanisms. The opposite end of the shaft 22, from that to which the handle is attached, is provided with a fly-wheel as shown at 24. This power shaft is equipped with a beveled gear 25 which meshes with a beveled pinion 26 carried at one end of the stud shaft 27, this shaft extending through the back plate 3, and at its opposite end is provided with a gear wheel 28 meshing with the gear pinion 29, the latter in turn meshing with and driving the gear wheel 30 mounted upon the shaft 31 which carries the shutter S. The result is that when the power shaft is turned, motion will be transmitted through the train of gearing just described to the shutter S to swing the same across the shutter opening at predetermined times, thus opening and closing the shutter as may be desired. Furthermore, connected to the intermediate portion of this power shaft 22, and driven therefrom, is the eccentric connecting rod 32 which is also loosely connected to the rod 33 fixed to the sliding cross-bar 34. This cross-bar 34 in turn is connected with the U-shaped sliding plate 35 at the opposite side of the plate 3 through the medium of the tongue 36, this tongue 36 passing through the elongated slot 37 of the plate 3.

As will be seen by reference to Fig. 6, the two arms 38 of the plate 35 slide along the front face of the back plate 3, one at each side of the shutter opening, and, in order to maintain the sliding plate 35 in proper alinement, a guide roller 39 is employed which is mounted in suitable bearing brackets 40. In order to substantially fill the space between the upper ends of the arms 38, and thereby prevent the entrance of light beneath the roller 39, I provide a suitable filler block 41 which is bolted, as at 42, to the front face of the back plate, the lower end of this plate projecting between the two arms 38 and beneath the roller so that at this point, the camera is made substantially light tight. Furthermore, it will be noted, especially by reference to Fig. 6, that the segmental shutter S in its opening and closing movement swings in the path across the outer face of the sliding plate. A plate 43 is also employed to cover and act as a support or bearing for the shafts of the gear 28, the pinion 29 and the gear 30. Each arm 38 of the sliding plate 35 is formed with a lug 44 which is adapted to project through an adjacent elongated slot 45 in the back plate 3, these slots 45 lying one at each side of the shutter opening as is shown in Fig. 4, and these lugs not only act as a guide for the arms of the plate in its vertical sliding movement, but each of these lugs is also adapted to be contacted with by a film clamping foot 46. As will be understood by reference to Fig. 4, I employ a pair of these clamping feet, or one at each end of a clamping arm 47. Each clamping arm 47 is pivotally mounted or fulcrumed intermediate its end, as at 48, on the rod 33 carried by the sliding bar 34. Each clamping foot is provided with a contracting spring 49 which normally tends to draw the foot downwardly into contact with the lug 44 therebeneath, so that when a film is passed between the pair of clamping feet and the lugs such film will be clamped at its edges between the feet and the lugs on the arms 38 of the sliding plate 35. The result will be that when the power shaft is turned and the film is so clamped, the plate 35 will be shifted and the clamping arms will draw the film down past the shutter opening. When the film is thus moving it is to be understood that the shutter will be closed, while, when the film is stationary the shutter will be open. In order to release the clamping action of the clamping feet and consequently permit the film to remain stationary for exposure, I provide upon the power shaft 22 a pair of eccentric cams 50 which cams are adapted to bear against the rear ends 51 of the arms 47, and depressing these rear ends of the arms cause the clamping feet 46 to be raised from contact with the film, as indicated in dotted lines in Figs. 9 and 10. By reference to these figures it will be seen that when the toes of the cams bear against the rear ends 51 of the clamping arms, such rear ends will be depressed and the front or foot carrying ends of the arms will be raised against the tension of the springs 49, while, when the toes of the cams have released their pressing action upon the pressing arms and the heels of the cams are riding over the arms the depressing action being released, the springs will again draw the clamping feet into clamping engagement with the film. Carried by the brackets 52 is a shaft 53 upon which is fixed the gear-wheel 54, the latter meshing with the pinion 55 on the drive or power shaft 22. The opposite end of the shaft 53 is provided with a pulley 56 over which travels the endless belt 57, this belt also training over the pulley 58 carried by the shaft 8' of the lower spool 8. When it is desired to obtain a relatively high speed in the movement of the shutter, as in taking pictures, the detachable handle *h* may be attached to the shaft 53 and the latter operated to drive the lower spool 8 and wind the film upon the latter, while, when it is desired to use a relatively low speed, as for instance, for the printing operation, the handle *h* may be connected directly to the end of the power shaft 22.

The above is a description of the structural features of the film feeding and shutter operating mechanisms contained in the housing H. In addition, when the operation of printing the exhibition film from the master film is to be followed, I employ an extra film spool 59 which is carried by the bracket 60, as shown in Fig. 2. This bracket is intended to be detachably fastened to the back B by means of the set screws 60'. In the printing operation, as will be seen by reference to Fig. 2, the master or negative film F is reeled on this spool 59 while the sensitive exhibition film is reeled upon the spool 6, and the two films are trained through the various guides so that they pass the shutter opening with the master film imposed upon the exhibition film, a backing strip, preferably of dark colored paper and indicated at P, being wound and unwound with the positive or exhibition film, as is clearly shown in Fig. 2.

From the above description, taken in connection with the accompanying drawings, the construction and manner of employing my invention will be readily apparent. In taking the picture, the apparatus appears, as in Fig. 1, and the sensitive master film F is trained over the spool and through the various guides and through the film clamping mechanism, as best shown in Figs. 7 and 8. The operator now turns the handle *h* and the picture is taken as usual with the shutter opening when the film is stationary and closing when the film is traveling. After this master or negative film has been developed, it is placed on the film spool 59 and the latter attached while the sensitive exhibition film is trained over the two spools 6 and 8, all as shown in Fig. 2. The lens L is now removed from the camera and a suitable light, in the present instance an electric lamp E is attached to the film end of the camera. The handle or crank *h* is now operated, being preferably attached to the power shaft 22, for slow speed, so that the two films are drawn together past the shutter opening, and thus the positive or exhibition film is printed from the negative or master film. After the exhibition film has been developed and it is desired to exhibit the same, it is again placed in the apparatus running from the spool 6 to the spool 8 while the light E is attached to the back of the housing H, the door 61 containing the usual red glass 62 being removed to permit the reflector 63 of the lamp to be attached. The lens is, of course, reapplied to the lens end of the camera so that the apparatus appears as in Fig. 3 with the exhibition film traveling between the light and the lens and thus the pictures may be projected upon the screen as will be readily understood.

It will be noted that I have provided a simple, compact, portable apparatus of relatively small bulk which will enable the ordinary person or non-professional operator to take such pictures as may be desired, and then print the film and exhibit the same in the home or elsewhere, without resorting to the use of a series of expensive, complicated, bulky machines. Of course, if desired, instead of attaching the apparatus to any well known form of camera, the camera may be made as a special and, if preferred, integral part of the apparatus. Furthermore, if desired, the step of printing with my apparatus may be omitted, and the machine used for the purpose of taking and exhibiting the pictures, while the printing may be done elsewhere.

While I have herein shown and described one particular embodiment of my invention, I wish it to be understood that I do not limit myself to all the precise details of construction herein set forth merely by way of illustration, as modification and variation may be made without departing from the spirit of the invention, or exceeding the scope of the appended claims.

What I claim is:

1. In a motion picture apparatus the combination with a camera, of a detachable rear wall forming a part of the camera casing, and film feeding mechanism carried by said wall.

2. In a motion picture apparatus the combination with a wall adapted to constitute the rear wall of a camera casing and having an opening therein, a shutter for said opening, and mechanism mounted on the wall for feeding a film past the opening.

3. In a motion picture apparatus the combination with a wall adapted to constitute the rear wall of a camera casing, said wall having an opening therein, a movable shutter for said opening, a film unwinding spool carried by the wall at one side of the opening, a film winding spool carried by the wall at the opposite side of the opening, and means mounted on the wall for feeding a film past the opening from one spool to the other.

4. In a motion picture apparatus, a camera having a detachable rear wall, film supporting and film feeding devices carried by said wall, and means associated with the camera for projecting the pictures of a film on a suitable surface for exhibition purposes.

5. In a motion picture apparatus the combination with a camera having a detachable rear wall, of film supporting and film feeding devices carried by said wall, a housing for said film supporting and said film feeding devices, and a lamp adapted to be connected with said housing for projecting the pictures of a film on a suitable surface for exhibition purposes.

6. In a motion picture apparatus, a camera for taking pictures on a film, said camera having a removable wall constituting the rear wall of the camera casing, film supporting mechanism and film feeding mechanism carried by said wall, means associated with the camera and including a lamp for printing a second film from the first mentioned film, and means associated with the camera for projecting the pictures of the second film on a suitable surface for exhibition purposes.

7. In a moving picture apparatus the combination with a camera having a removable rear wall provided with an opening, mechanism carried by the wall for feeding a film past the opening, a housing connected with the wall for housing the film feeding mechanism, the said housing having an opening in one wall thereof alining with the opening of the removable rear wall, a shutter for the opening of said rear wall, means for attaching a lamp to the housing adjacent the opening thereof, and means for attaching a lamp to the lens end of the camera.

8. In a moving picture apparatus the combination with a suitable casing, of a film arranged therein, means for feeding the film, means for attaching a lamp at one end of the casing when the apparatus is used for picture projecting purposes, and means for attaching a lamp at the opposite end of the casing when the apparatus is used for printing pictures from the film.

9. The combination with a moving picture apparatus, including a suitable casing and a traveling film therein, of means for attaching a lamp to one end of the casing for projecting the pictures of the film, and means for attaching the lamp to the opposite end of the casing for printing pictures from the film.

10. The combination with a camera including a detachable lens, film feeding mechanism for the camera, a lamp, and means for attaching the lamp to the lens end of the camera when the lens is detached.

11. A moving picture apparatus including a casing having a detachable lens at one end and an opening at the opposite end, means located within the casing for feeding a film, a lamp, and means for selectively attaching the lamp to the lens end of the casing and to the opposite end of the casing adjacent the opening in such end.

12. An attachment for a camera comprising a removable wall adapted to constitute one of the outer walls of a camera, said wall having an opening therein, a housing connected with the wall, and mechanism carried by the wall and located within the housing for feeding a film past the opening.

13. An attachment for a camera including a wall adapted to constitute the rear wall of the camera, said wall having an opening therein, a shutter controlling said opening, a housing attached to the wall, film feeding mechanism located within the housing, means for actuating the film feeding mechanism, and means for operating the shutter.

14. A motion picture attachment for a camera comprising a wall adapted to constitute an outer wall of the camera casing, said wall being detachable from said camera casing, a housing adapted to be detachably connected with said wall, the latter also constituting a wall for the housing, film spools rotatably mounted within the housing, means also within the housing for imparting a step-by-step advancing movement to the film, and means located outside of the housing for imparting movement to the film advancing means and to one of the film spools.

15. A motion picture attachment for cameras, comprising a detachable wall adapted to constitute the rear wall of a camera casing, a housing detachably connected with said wall, the latter also constituting a front wall for the housing, film spools rotatably mounted within the housing, means also located within the housing for imparting a step-by-step advancing movement to a film, a shutter movable past an opening in the housing, and means located outside the housing for actuating the shutter and the film advancing means respectively.

16. A motion picture attachment for cameras comprising a wall adapted to constitute the rear wall of a camera, a housing attached to said wall, the latter forming a front wall for the housing, film spools within the housing, means also located within the housing and supported from the wall for imparting a step-by-step movement to a film to advance the same progressively across an opening in the wall, a movable shutter for said opening, means operable from without the housing for actuating the film advancing means and the shutter, and means for detachably supporting a lamp member opposite an opening in the housing arranged in substantial alinement with the shutter opening.

17. A motion picture attachment for cameras comprising a wall member adapted to be detachably connected to a camera and to constitute the rear wall of a camera casing, said wall having an opening therein, a shutter movable past said opening, a housing attached to the wall and having an opening therein alining with the opening in the wall, a closure for the housing opening, film spools within the housing, means also within the housing for imparting a step-by-step movement to a film, and manually operable means located without the housing for actuating the film moving means and the shutter.

18. A motion picture attachment for cameras comprising a wall member adapted to constitute the rear wall of a camera casing, said wall having an opening therein, a shutter located at one side of the wall and movable past that opening, film feeding mechanism located on the opposite side of the wall for imparting a step-by-step advancing movement to a film, manually operable means for actuating respectively the shutter and the film feeding mechanism, and a housing fitted on said wall.

19. A motion picture attachment for cameras, comprising a detachable wall member adapted to constitute an outer wall of a camera casing, a housing adapted to be detachably connected with said wall, the latter also constituting a front wall for the housing, film spools rotatably mounted within the housing, film training means for guiding a film from one spool to the other past an opening in the aforesaid wall, film feeding mechanism for imparting a step-by-step movement to a film, a shutter movable past the opening in the wall, gearing for operating the shutter and film feeding mechanisms respectively, and means for imparting motion to said gearing.

20. A motion picture attachment for cameras including a wall adapted to be detachably connected to the rear of a camera casing and to constitute the rear wall of such casing, said wall having an opening therein, of a shutter located at one side of the wall and adapted to move past said opening, film feeding mechanism located at the opposite side of the wall and adapted to engage a film to feed the latter past the opening, and mechanism operable to open the shutter when the film feeding mechanism is engaging with and feeding the film and to close the shutter when the film feeding mechanism is in non-film-feeding position.

21. The combination with a housing and a wall having an opening therein, of a shutter movable past the opening in the wall, a film winding spool and a film unwinding spool located in the housing, a hinged bar located between the two spools and carrying a guide roller for guiding the film as it passes from the unwinding to the winding spool, film feeding device including a sliding plate and fulcrumed clamping arms for intermittently feeding the film past the opening, a power shaft, a crank connection between the power shaft and the plate for sliding the latter, cams on the power shaft for disengaging the clamping arms from the film, and power transmission gearing between the power shaft and the shutter for moving the latter when the clamping arms are disengaged from the film.

22. In a motion picture attachment, the combination with a wall adapted to be detachably connected with and to constitute an outer wall of a camera casing, said wall having an opening therein, of a shutter located adjacent the inner side of said wall and movable past the opening, film supporting and film feeding devices attached to the outer side of said wall, said film feeding devices being adapted to feed a film past the opening in the wall, a housing fitted to the outer side of the wall and incasing the film feeding and film supporting devices, said housing having an opening in one of the walls thereof in line with the opening in the first mentioned wall, and means for attaching a lamp to the housing adjacent the opening in the wall thereof.

In testimony whereof I have hereunto set my hand in presence of two subscribing witnesses.

HENRY CSANYI.

Witnesses:
A. DE MOTT,
J. FRANVILLE MEYERS.